(12) United States Patent
Van Lent et al.

(10) Patent No.: US 12,172,380 B2
(45) Date of Patent: Dec. 24, 2024

(54) FFF PRINTING SYSTEM WITH A FILAMENT PATH LENGTH MEASURING DEVICE FOR ALIGNMENT OF FEEDER AND PREFEEDER

(71) Applicant: Ultimaker B.V., Utrecht (NL)

(72) Inventors: Arend-Jan Van Lent, Utrecht (NL); Rijk Van Manen, Utrecht (NL); Teun Van Beek, Utrecht (NL)

(73) Assignee: Ultimaker B.V., Geldermalsen (NL)

( * ) Notice: Subject to any disclaimer, the term of this patent is extended or adjusted under 35 U.S.C. 154(b) by 361 days.

(21) Appl. No.: 17/761,644

(22) PCT Filed: Sep. 23, 2020

(86) PCT No.: PCT/NL2020/050584
§ 371 (c)(1),
(2) Date: Mar. 18, 2022

(87) PCT Pub. No.: WO2021/060977
PCT Pub. Date: Apr. 1, 2021

(65) Prior Publication Data
US 2022/0388245 A1 Dec. 8, 2022

(30) Foreign Application Priority Data
Sep. 23, 2019 (NL) ...................................... 2023878

(51) Int. Cl.
*B33Y 30/00* (2015.01)
*B29C 64/321* (2017.01)
(Continued)

(52) U.S. Cl.
CPC .......... *B29C 64/386* (2017.08); *B29C 64/321* (2017.08); *B29C 64/393* (2017.08);
(Continued)

(58) Field of Classification Search
CPC ... B29C 64/386; B29C 64/393; B29C 64/321; G01B 7/003; G01B 7/023
See application file for complete search history.

(56) References Cited

U.S. PATENT DOCUMENTS

2018/0178448 A1 6/2018 Kakuta
2019/0055104 A1* 2/2019 Hayes .................... B33Y 50/02
(Continued)

FOREIGN PATENT DOCUMENTS

WO 2018/219698 A1 12/2018

*Primary Examiner* — Emmanuel S Luk
*Assistant Examiner* — Nicholas J Chidiac
(74) *Attorney, Agent, or Firm* — N.V. Nederlandsch Octrooibureau

(57) ABSTRACT

The invention relates to an FFF printing system (100), the FFF printing system comprising a print head (105), a feeder (91; 126) arranged to feed a filament (4) into the print head (105), and a container (801) for storing the filament on one or more filament spools (88). The system also comprises a prefeeder (81) arranged to feed the filament from the spools to the feeder (91; 126), and a first flexible tube (D01; 102; 121) for guiding the filament (4). A filament path length measuring device (1) is arranged to detect a misalignment between the feeder and the prefeeder. Measurement signals are sent to a processing system to correct any misalignment.

12 Claims, 14 Drawing Sheets

(51) Int. Cl.
*B29C 64/386* (2017.01)
*B29C 64/393* (2017.01)
*B33Y 40/00* (2020.01)
*B33Y 50/00* (2015.01)
*B33Y 50/02* (2015.01)
*G01B 7/00* (2006.01)
*G01B 7/02* (2006.01)

(52) U.S. Cl.
CPC ............... *B33Y 30/00* (2014.12); *B33Y 40/00* (2014.12); *B33Y 50/00* (2014.12); *B33Y 50/02* (2014.12); *G01B 7/003* (2013.01); *G01B 7/023* (2013.01); *G01B 7/026* (2013.01)

(56) References Cited

U.S. PATENT DOCUMENTS

2020/0139634 A1* 5/2020 Hikmet .................. B33Y 10/00
2024/0100772 A1* 3/2024 Fine ....................... B29C 64/393

* cited by examiner

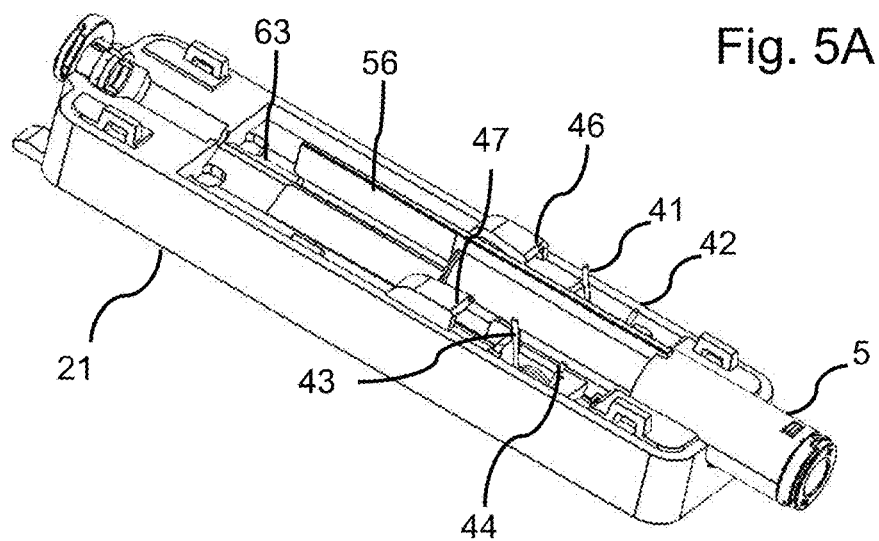
Fig. 5A
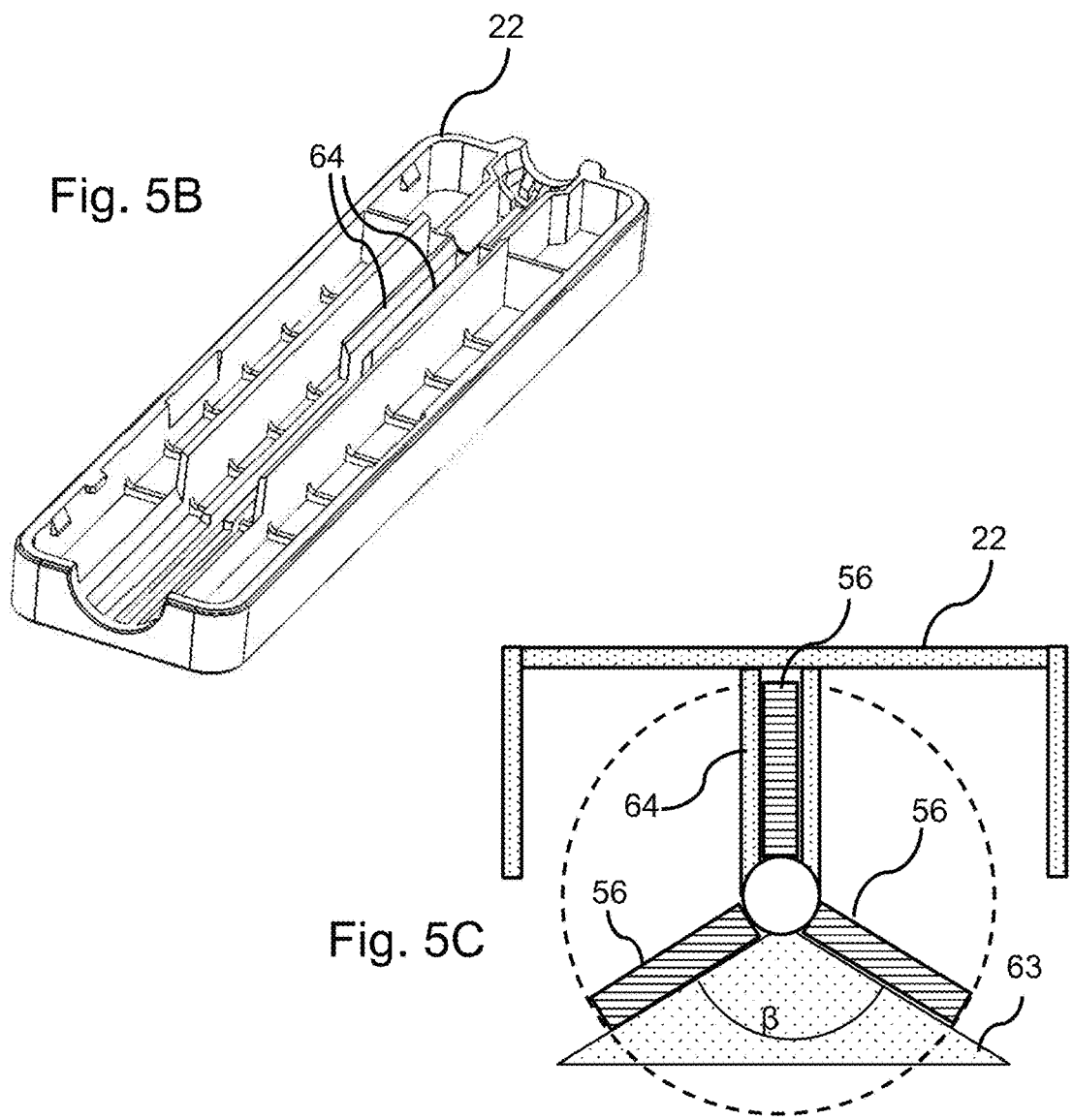
Fig. 5B
Fig. 5C

FFF PRINTING SYSTEM WITH A FILAMENT PATH LENGTH MEASURING DEVICE FOR ALIGNMENT OF FEEDER AND PREFEEDER

FIELD OF THE INVENTION

The present invention relates to an FFF printing system with a filament path length measuring device, and to such a measuring device for use in such a system. The invention particularly relates to an FFF printing system with a feeder and a prefeeder.

BACKGROUND ART

Fused filament fabrication (FFF) is a 3D printing process that uses a continuous filament of a thermoplastic material. Filament is fed from a coil through a moving, heated print head, and is deposited through a print nozzle on the growing work. The print head may be moved under computer control to define a printed shape. Usually, the print head moves in two dimensions to deposit one horizontal plane, or layer, at a time. The work or the print head is then moved vertically by a small amount to begin a new layer.

Mostly filament coils are arranged on a spool which may be mounted on a housing of the 3D printing device. The filament is fed to the print head by way of a feeder. In FFF filament fabrication there are two main types of printing devices, referred to as Direct feeder printing device and Bowden printing device. In a direct feeder printing device, the feeder is arranged in or on top of the print head. A filament is fed to the feeder from a spool of filament. In a Bowden printing device, the feeder is arranged external from the print head, and the filament is guided through a Bowden tube from the feeder to the print head. In both scenarios the feeder generates a feeding force for feeding the filament through the print head and a pulling force for unrolling the spool.

In systems where a filament spool is stored in a special storage compartment, the unrolling of the spool may require additional force for several reasons. Systems are known that comprise an additional feeder for feeding filament from the storage compartment to the feeder of the printing device. Such additional feeders are also referred to as Prefeeders.

When using a prefeeder, this prefeeder needs to be operated in line with the actions of the (printer) feeder so as not to cause any disturbance in the filament feeding process. Today's systems for alignment of feeders and prefeeders use complex measuring devices for sensing misalignment between the feeder and the prefeeder. Such measuring devices are often very error prone.

Publication WO2018219698 (A1) discloses an FFF printer and a method with force feedback for printing non-uniform filaments. The patent application does not disclose an FFF printing system with a feeder and a prefeeder. In the described FFF printer, a filament is fed through a guide tube. In an embodiment, the guide tube is cut into two parts, and a stress/strain gauge is placed between the two parts for measuring the force applied during the extrusion. The FFF printer is configured to transport the filament through the transport channel. Due to the presence of the gauge, the transport channel comprises an upstream part and a downstream part which are associated to each other via a pressure sensor for sensing a force-related parameter for controlling deposition of the 3D printable material. Based on the sensor signal, the control system may control the force, for instance to maintain a constant diameter of the filament escaping from the printer nozzle. The pressure sensor is connected between a housing of the gauge and an end stop coupled to one of the tube parts. In this way the two tube parts are coupled via the pressure sensor, which is of course needed in order to let the sensor measure a pressure value. The measuring range may be sufficient for this application, but it will not suffice when needing accurate alignment of a feeder and a prefeeder.

SUMMARY OF THE INVENTION

One of the objects of the invention is to provide a measuring device which is less error prone as compared to the prior art solutions.

A first aspect of the invention provides an FFF printing system, the FFF printing system comprising:
 a print head;
 a feeder arranged to feed a filament into the print head;
 a container for storing the filament on one or more filament spools;
 a prefeeder arranged to feed the filament from the spools to the feeder;
 a first flexible tube for guiding the filament, and
 a filament path length measuring device.
The filament path length measuring device comprises:
 a housing comprising a first opening for passing through of the filament, and a second opening opposite the first opening;
 a slider slidably arranged in the housing and partly extending out of the second opening, the slider comprising a filament channel for passing through of the filament, wherein an outer end of the slider, that is outside the housing, is connected to a first end of the flexible tube;
 at least one contactless sensor arranged to detect a change of position of the slider relative to the housing to obtain measurement data indicative of a path length change of the filament in the first flexible tube.

A second end of the first flexible tube is connected to a connection point of the FFF printing system that is static relative to the housing of the measuring device.

The FFF printing system further comprises a processing system arranged to receive the measurement data and to control the prefeeder depending on the measurement data. The filament path length measuring device is arranged to detect a misalignment between the feeder and the prefeeder. Measurement signals are sent to the processing system to correct any misalignment. By measuring the path length change of the filament in the flexible tube, the actions of a prefeeder can be aligned with the actions of the feeder. An advantage of the usage of a slider and a contactless sensor is that no, or very little force is required. So, no additional unwanted force is applied to the filament. In this way more accurate measurements are achieved, and the control of the feeders can be optimized.

Since the slider is partly extending out the housing of the measuring device, it forms a telescopic part of the measuring device. In this way, the slider can be manipulated manually from outside the housing, which is convenient during calibration procedures. During calibration, the slider can be moved manually over its range of motion, which allows easy calibration.

Depending on the type of printing system, the flexible tube may be connected to different connection points. In an embodiment, the flexible tube is connected an upstream side of the feeder. In another embodiment, the flexible tube is connected a downstream side of the prefeeder. In yet another embodiment, the system comprises a merger module arranged to merge filaments coming from different spools, wherein the flexible tube is connected a downstream side of the filament merger module.

In an embodiment, the FFF printing system comprises a further processing system arranged to control the feeder and arranged to communicate with the processing system. This embodiment is advantageous in the situation wherein an FFF printer is combined with a separate filament feeding system, wherein both systems have their own processing system specialized in their own tasks, and able to communicate with each other. The processing system may be arranged to communicate status information on the filament feed status to the further processing system arranged in the FFF printer. Using such a modular system requires little redesign of the FFF printer. Only some software reprogramming is needed.

In an embodiment, the at least one sensor comprises a Hall sensor. An advantage of using a Hall sensor is that it allows for an analogue position detection of the slider. A continuous analogue signal is produced, which is easy to pre-process.

In an embodiment, the at least one sensor comprises two Hall sensors interacting with a single magnet mounted on the slider. Due to a combination of two Hall sensors interacting with an intermediate magnet, the slider can have a larger stroke as compared to that of a device having a single Hall sensor, given a certain sensitivity of a Hall sensor and a certain magnet strength. In an embodiment, the device comprises an analogue circuitry arranged to combine the output signals of the two Hall sensors, to obtain an analogue signal indicative of the change of position of the slider. A further advantage of using two Hall sensors is that such a configuration yields a high signal/noise ratio where it matters most: at both ends of the range of motion of the slider. The outputs of the two sensors may be combined so that only one 10 pin is needed and there is no need for digital processing.

In an embodiment, the measuring device comprises a torsion spring having two spring arms, each of the spring arms being arranged to counteract movement of the slider at an outer end of a stroke of the slider. The spring arms allow for movement of the slider but counteract the movement of the slider at the outer end of its stroke. Preferable, the Hall sensors are arranged to detect the slider position in a mid-region and at the two outer regions where movement the slider counteracted by the spring arms.

In an embodiment, the slider comprises a number of fingers coaxial arranged around a central axis, wherein side walls of the fingers facing the central axis, together with structures arranged in the housing, define a channel for guiding the filament.

The fingers can surround the filament and will slide relative to the structures in the housing. They will guide the filament through a channel without creating a stepped path, and there will be no unwanted ridge for the filament to catch.

In an embodiment, the slider comprises three fingers. Such a configuration is relatively easy to fabricate using injection moulded techniques. Furthermore, if more than three fingers would be used, they would have reduced the wall thickness which is less favourable, since the device would then be flimsy and more difficult to produce.

In an embodiment, the housing of the measurement device is mounted to outer wall of the FFF printing system. Placing the filament path measuring device at the outside of the system, makes the device easily accessible for a user who may need to perform calibration methods. It should be noted that the measurement could alternatively be placed within the system so as to hide the device in order to protect it against outer forces and/or for aesthetic reasons.

In an embodiment, the FFF printing system is a modular system comprising a printing apparatus and a filament feeding system. In this embodiment the processing system may be arranged in the filament feeding system and configured to communicate with a processor of the printing apparatus. In this way the processing system can receive instructions for controlling the prefeeder in line with the printer feeder. An advantage of such a modular system is that in case of malfunctioning, only one of the modules needs to be replaced or repaired.

In an embodiment, the first flexible tube has an S-shape. This special shape can avoid axial forces on the tube and thus on the slider and thus on the filament. So, the slider will only experience lateral forces caused by a change of filament path length.

BRIEF DESCRIPTION OF THE DRAWINGS

These and other aspects of the invention are apparent from and will be elucidated with reference to the embodiments described hereinafter. In the drawings, FIG. 1A schematically shows an example of a filament path length measuring device according to an embodiment of the invention;

FIG. 5A is a perspective view of a bottom part of the housing;

FIG. 5B shows an example of a top part to be coupled to the bottom part shown in FIG. 5A;

FIG. 5C shows a cross section of the slider at the location of the fingers and the support structure;

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF EMBODIMENTS

Figure 1A:
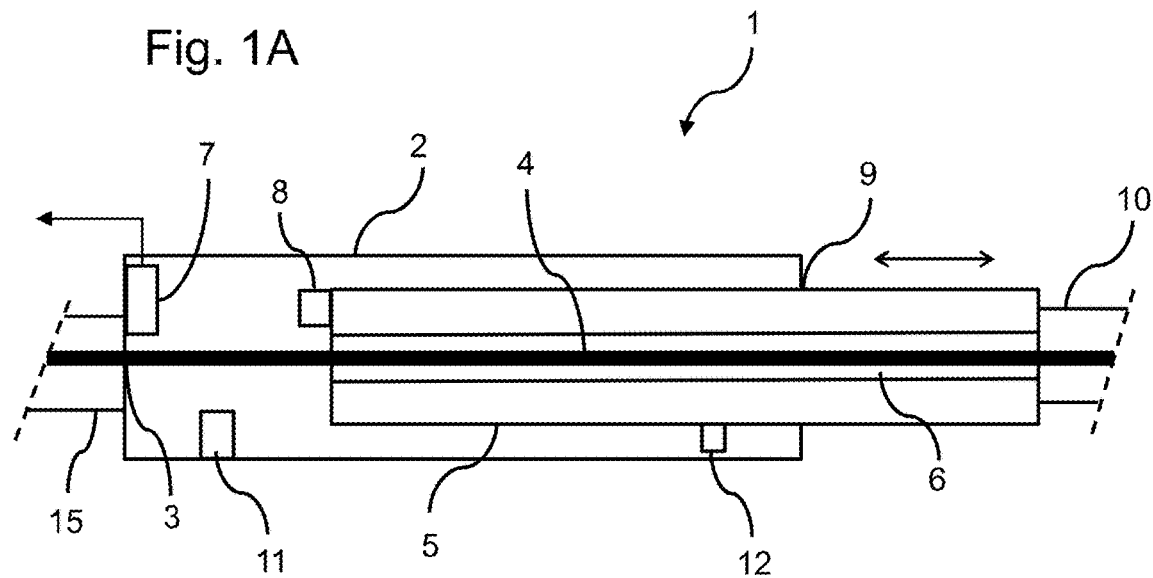
FIG. 1B schematically shows an example of a filament path length measuring device according to a further embodiment.

FIG. 1A schematically shows an example of a filament path length measuring device 1 according to an embodiment of the invention. The filament path length measuring device 1, also referred to as measuring device 1 comprises a housing 2 comprising a first opening 3 for passing through of a filament 4. The measuring device 1 also comprises a slider 5 slidably arranged in the housing 2. The slider 5 comprises a filament channel 6 for passing through of the filament 4. At an outer end, the slider 5 is connected to a flexible tube 10 for guiding the filament 4 to for example an input of a printer feeder (not shown). The housing 2 comprises a second opening 9 through which the slider 5 can, at least to some extent, leave the housing 2. In this embodiment, the slider 5 is an elongated part that forms a telescopic part of the device 1.

The measuring device 1 also comprises at least one sensor 7 arranged to detect a change of position of the slider 5 relative to the housing 2 to obtain measurement data indicative of a path length change of the filament 4. The measurement data can be communicated to a processing system (see arrow). The sensor 7 preferably comprises a contactless sensor 7 cooperating with a signal generator/reflector 8. The contactless sensor 7 may be an optical sensor, such as a time-of-flight sensor. Preferably, the sensor 7 comprises a Hall sensor 7 wherein the signal generator 8 comprises a magnet 8. The housing 2 of the measuring device 1 may be coupled to a second flexible tube 15 depending on the application of the measuring device 1. FIG. 1A also shows a first limiter 11 for limiting the movement of the slider 5 to the left, and a second limiter 12 for limiting the movement of the slider 5 to the right. In this very schematic example, the first limiter 11 is coupled to an inner wall of the housing 2, and the second limiter 12 is coupled to an outer wall of the slider 5, but it will be clear to the skilled reader that other solutions are conceivable.

Figure 1B:
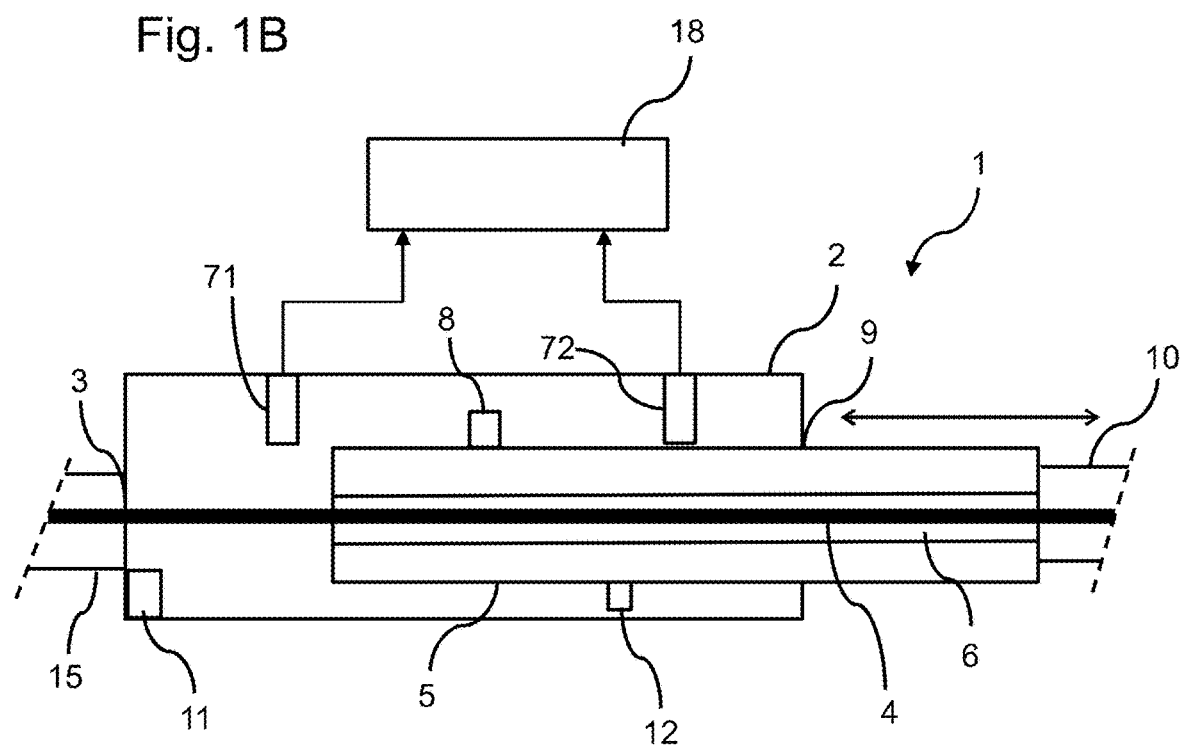

FIG. 1B schematically shows an example of a filament path length measuring device 1 according to a further embodiment. As compared to FIG. 1A, the measuring device 1 now comprises two Hall sensor 71, 72 which interact with a single magnet 8. Both Hall sensors 71, 72 provide input for an electrical circuitry 18 which is arranged to combine the signals of the Hall sensors 71, 72 to obtain a signal indicative of the displacement of the slider 5 relative to the housing 2. The two Hall sensors 71, 72 face in opposite direction and both sense the magnetic field of the magnet. Due to this combination of the Hall sensors 71, 72 and the intermediate magnet 8, the slider 5 can have a larger stroke as compared to that of the embodiment of FIG. 1A, given a certain sensitivity of one Hall sensor or magnet strength. A double arrow in FIG. 1B indicates the larger stroke. To enable this larger stroke of the slider 5, a repositioning of the limiters 11 and 12 is needed, see FIGS. 1A and 1B.

Figure 2A:
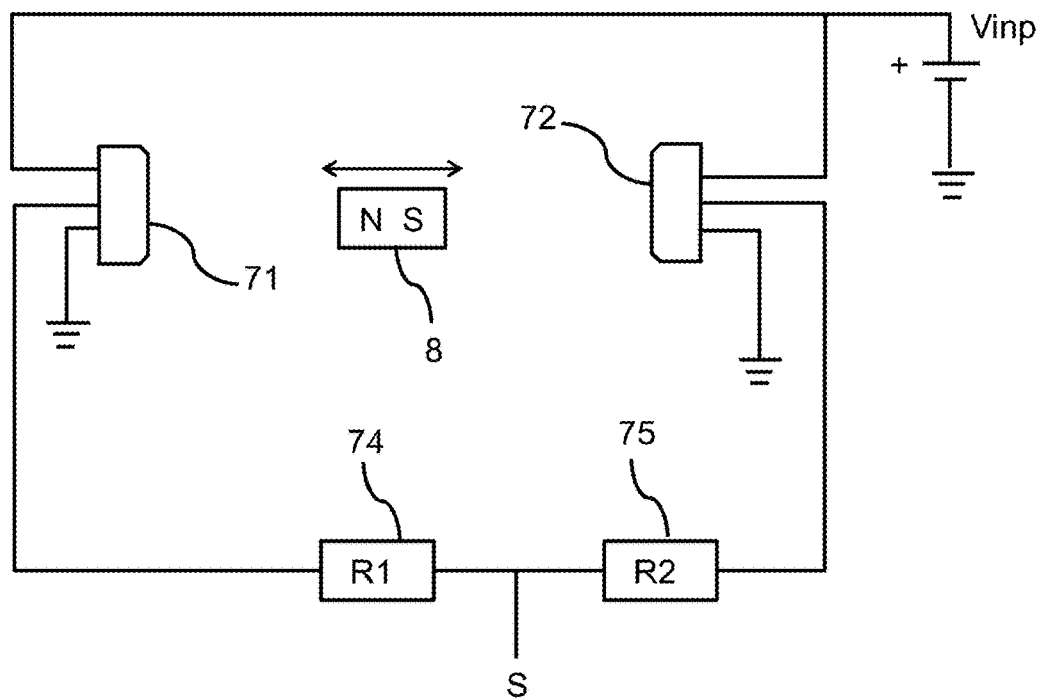
FIG. 2A shows an electrical schema incorporating the two Hall sensors and the magnet.
Figure 2B:
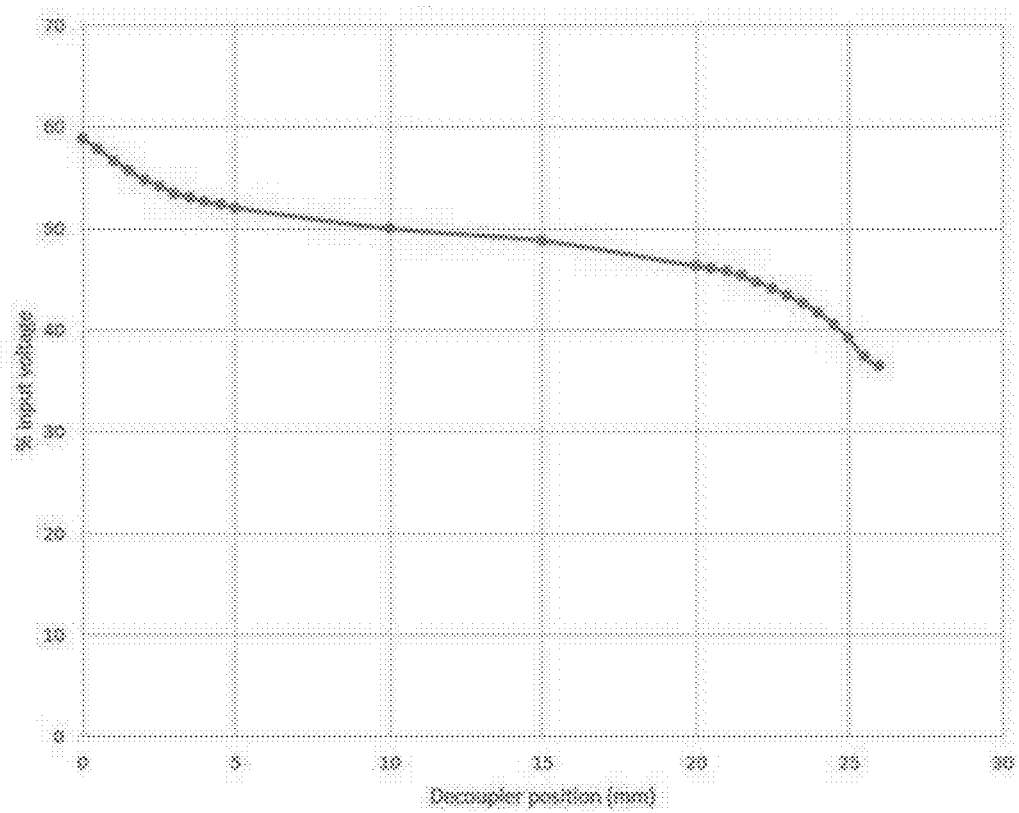
FIG. 2B is a graph of the output S of the scheme of FIG. 2A as a function of the position of the magnet being the slider position relative to the housing.

FIG. 2A shows an electrical schema incorporating the two Hall sensors 71, 72 and the magnet 8. The magnet 8 is mounted onto the slider 5, see FIG. 1B, so the magnet 8 is movable relative to the two Hall sensors 71, 72. Both Hall sensors are fed using a voltage of Vinp. In this example, the output of each Hall sensor is connected to a terminal of a resistor, see resistors 74, 75. These two resistors 74, 75 are connected at their other terminals to form an output node S. If two identical Hall sensors are used, and the resistors 74, 75 have equal value (R1=R2) then an output can be generated as shown in FIG. 2B. FIG. 2B is a graph of the output S of the scheme of FIG. 2A as a function of the position of the magnet 8 being the slider position relative to the housing, also referred to as 'Decoupler position'. In FIG. 2B the value of S is indicated as a percentage of the input value Vinp of the Hall sensors. In this example the decoupler position varies between 0 and 27 mm. The graph of FIG. 2B can mainly be divided in three regions: a first region showing a non-linear decreasing curve between 0-5 mm, a second region with a nearly linear and slowly decreasing line, and a third region with a non-linear decreasing curve between 22-27 mm. It is noted that a gradient of the curve in FIG. 2B directly relates to the sensitivity of the measuring device. So, in the first and third region, the sensitivity is higher as compared to the second region. This is advantageous as the higher signal/noise ratio increases position sensor accuracy where it matters most: close to both limiters and at both springs.

Figure 3A:
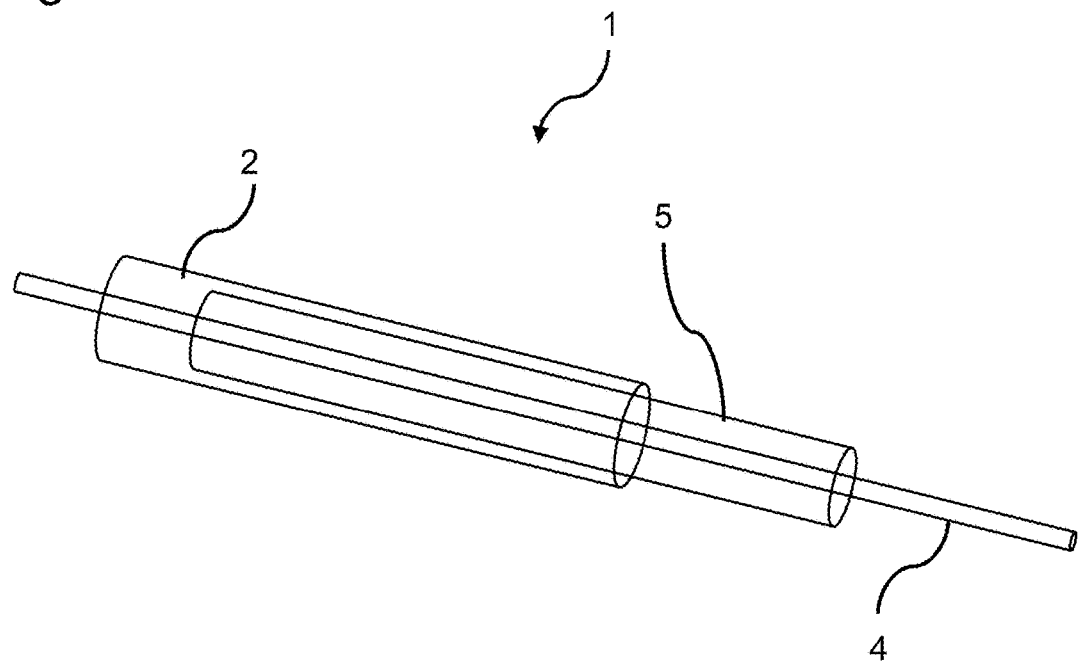
FIG. 3A is a perspective view of a simple embodiment, wherein the housing is an outer cylinder and the slider is a thinner inner cylinder.
Figure 3B:
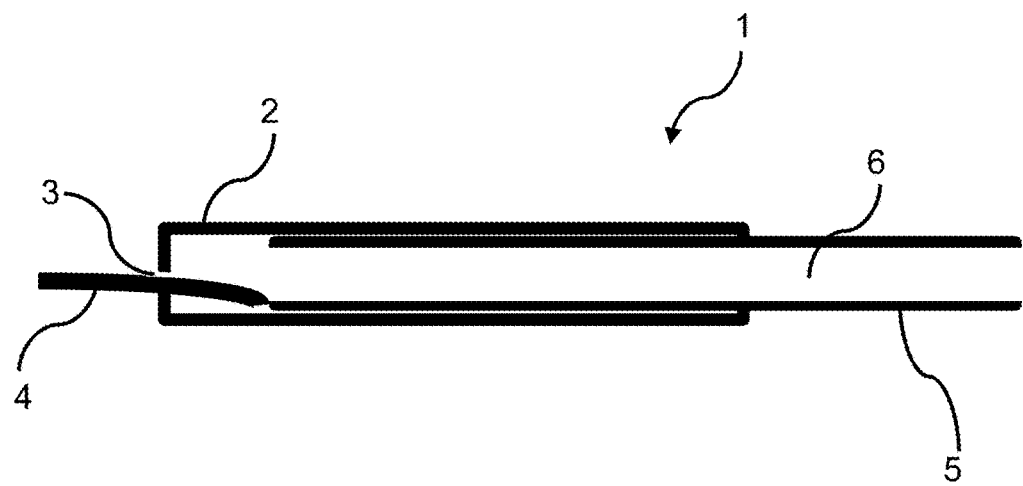
FIG. 3B shows a cross section of the embodiment of FIG. 3A.

In a simple embodiment, the housing 2 is an outer cylinder and the slider 5 is a thinner inner cylinder movable within the outer cylinder wherein the filament can pass through both cylinders, see FIG. 3A. In FIG. 3B the cylinders of FIG. 3A are shown again but with their width shown. In FIG. 3B the filament is inserted into an opening 3 at the left and pushed to the right. This situation may occur if a new filament is fed from the prefeeder to the feeder. As can be seen in the drawing, the filament 4 may get stuck at a threshold (or ridge) at the entrance of the inner cylinder 4. In the figures described below this problem is solved using special designs of the slider and the housing.

Figure 4A:
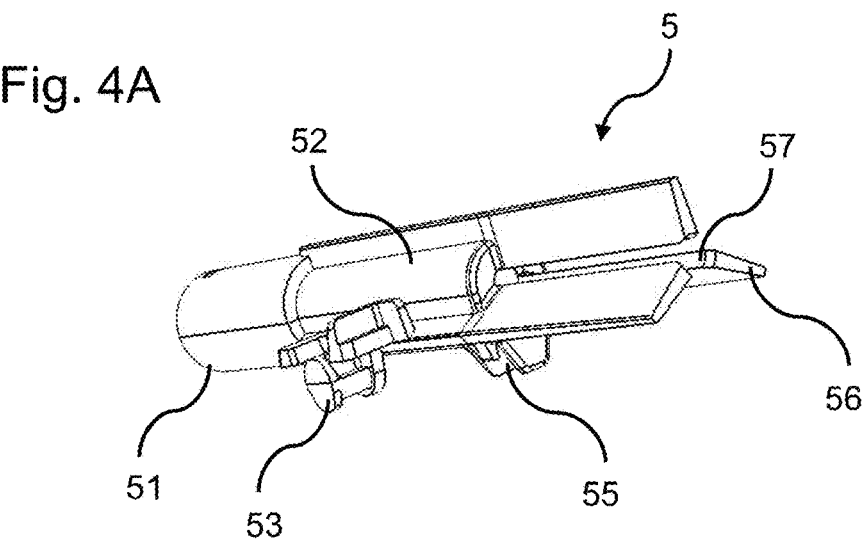
FIG. 4A is a perspective view of a slider according to an embodiment.
Figure 4B:
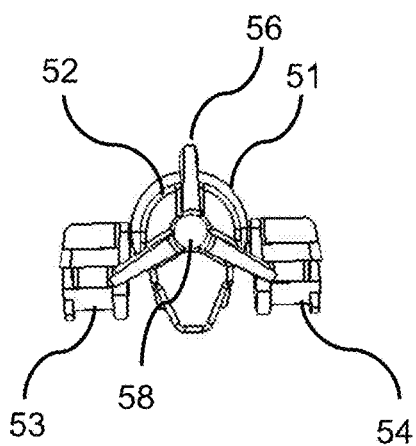
FIG. 4B shows a front view of the slider of FIG. 4A.

FIG. 4A is a perspective view of a slider 5 according to an embodiment. The slider 5 can be fabricated as a single moulded part, but alternatively could be assembled using subparts being glued or welded or screwed together. Alternatively, the slider 5 could be manufactured using an additive manufacturing technique such as FFF. The slider 5 comprises a first cylindric body 51, a second cylindrical part 52 having a slightly smaller diameter, and two spring holders 53, 54 coupled at two opposing sides to the second cylindrical body 52. The spring holders 53, 54 are arranged to each hold a torsion spring (not shown). It is noted that instead of two springs, only one torsion spring could be used. Two torsion springs arranged at both sides of the slider are preferred since the avoid any unwanted momentum on the slider. The slider 5 further comprises a magnet holder 55 for storing the magnet 8, see also FIG. 1B. The slider 5 also comprises three fingers 56 which extend from the first cylindrical body 51 in an axial direction parallel to a main axis of the slider 5. Each of the fingers 56 has a side wall 57 facing the main axis of the slider 5. As such the side walls 57 of the fingers 56 define a channel 58. This channel 58 is shown in FIG. 4B which shows a front view of the slider 5. Since in this embodiment both the first and second cylindrical part 51 and 52 are hollow, the filament 4 can pass through the slider 5 from one side to the other.

Figure 4C:
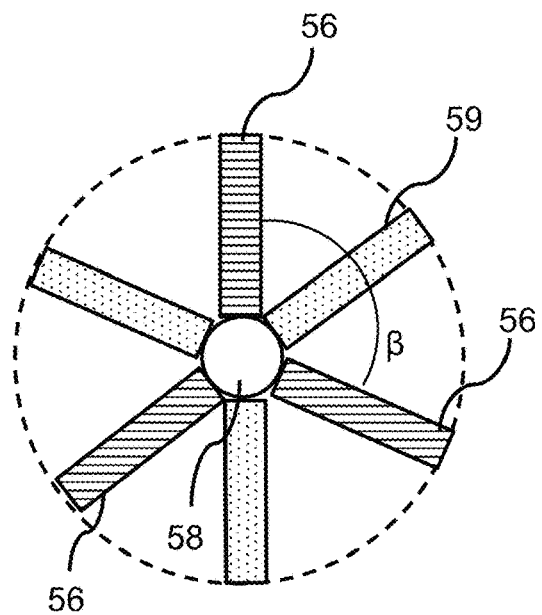
FIG. 4C shows an example of a cross section of the fingers together with an additional set of fingers arranged in the housing.

In an embodiment the fingers of the slider 5 cooperate with structures arranged in the housing. FIG. 4C shows an example of a cross section of the fingers 56 together with an additional set of fingers 59 (dotted fingers) arranged in the housing, which fingers extent in the axial direction in the same way as the fingers 56, but in the opposite direction. The fingers 56 make an angle β, with β=120 degrees. In this example the fingers 59 are of equal dimensions as the fingers 56 and also make an angle equal to β. So, the fingers 59 by themselves enclose, at least partly, the same channel 58.

If the slider 5 comprising the fingers 56 moves relative to the housing comprising the fingers 59, the fingers 56 move relative to the fingers 59 but due to their configuration, they intertwine and form a channel at a region where they overlap. They also form the channel 58 at regions where they do not overlap. Now if a filament 4 is fed through the measurement device 1, the filament will not meet a threshold as was the case at FIG. 3B. So, the risk of getting a filament stuck in the measuring device is minimized.

It is noted that this solution of sets of fingers mating may also work using sets of four (or even more) fingers. Preferably the side walls of the fingers facing the main axis are curved to form parts of the outer circumference of the circular channel 58.

The housing 2 may comprise a bottom part and an associated top part for closing the bottom part, once the slider is installed in the bottom part. FIG. 5A is a perspective view of a bottom part 21 of the housing 2. As can be seen from FIGS. 5A and 5B, the housing in this embodiment is a beam shaped box. Before placing the slider 5 in the bottom part 21, two torsion springs are arranged at both side of the slider onto the spring holders 53, 54. Each of the torsion springs comprises two arms which are indicated in FIG. 5A with reference numbers 41, 42, 43 and 44. The arms 41 and 43 (referred to as the 'lower arms' 41, 43) will meet abutments 46, 47 respectively once the slider has moved sufficiently into the housing. Similarly, the arms 42 and 44 (referred to as the 'upper arms' 42, 44) will meet associated abutment when the slider 5 moves sufficiently out of the housing. As such, the arms of the torsion spring function as limiters mentioned in FIG. 1B, see 11 and 12, but now in a biased manner. Note that the abutments can be positioned at different distances from the torsion spring mounting boss, so that each abutment results in a different force, as it flexes the torsion spring closer to/further from the mounting boss.

Two of the three fingers 56 of the slider 5 make contact with a support structure 63 arranged in the bottom part 21. The support structure 63 comprises two surfaces making an angle β equal to 120 degrees. The angle may depend on the angle between the fingers 56 of the slider 5 as will be explained below when discussing FIG. 5C.

FIG. 5B shows an example of a top part 22 to be coupled to the bottom part 21 shown in FIG. 5A. In this particular embodiment, the top part 22 comprises two walls 64 with angled outer ends. In a closed state of the housing 2, these two walls 64 will be arranged at both sides of one of the fingers 56 of the slider. This is shown in FIG. 5C which shows a cross section of the slider 5 at the location of the fingers and the support structure 63. As can be seen from FIG. 5C, a channel is now formed and enclosed by the three fingers 56, the two walls 64 and the support structure 63. Although different in design, the creation of an extendable and threshold-free channel is similar to that described with reference to FIG. 4C.

Figure 6:
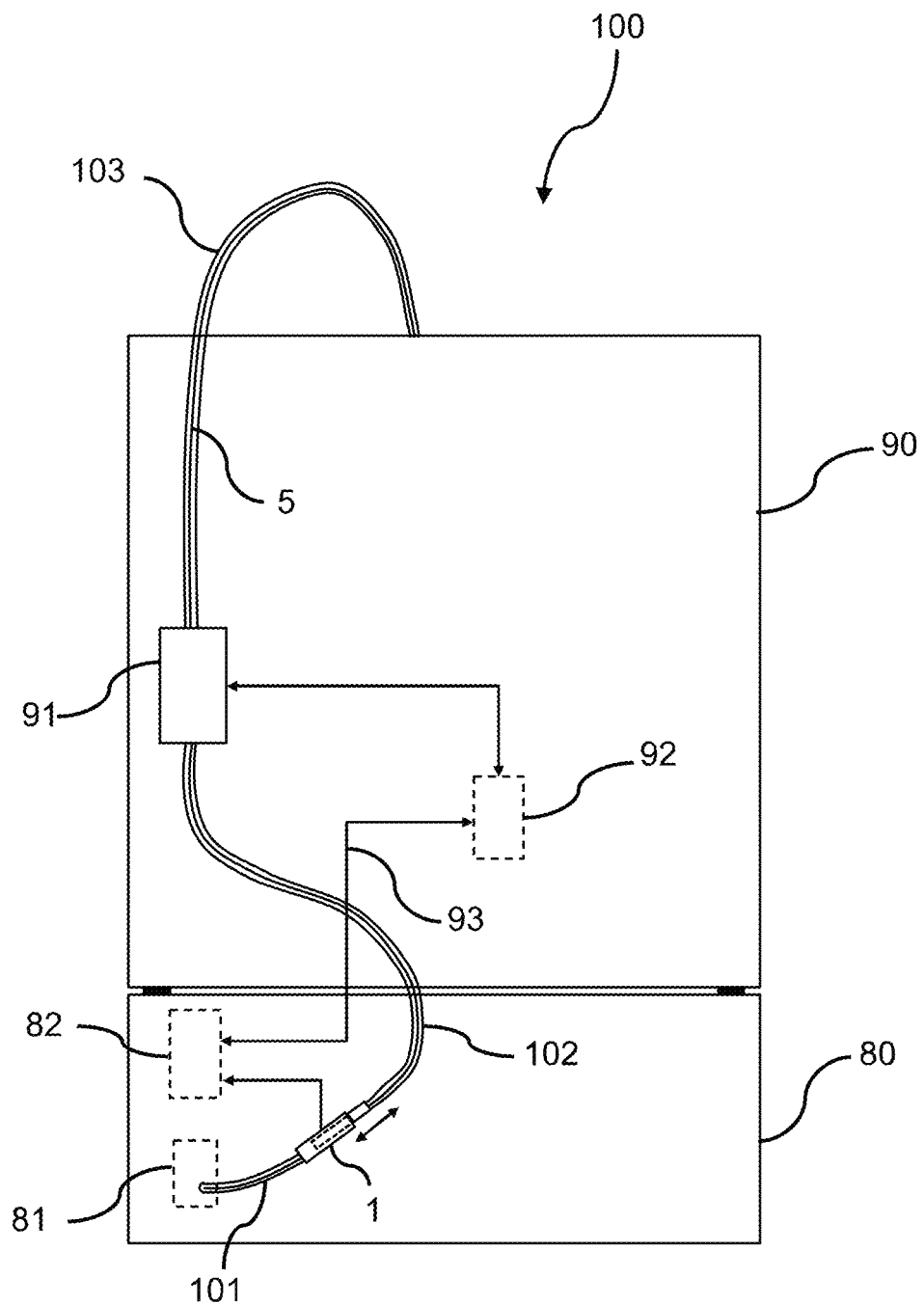
FIG. 6 schematically shows an example of a filament feeding system with an FFF printing apparatus on top of it.

FIG. 6 schematically shows an example of an FFF printing system 100 comprising a filament feeding system 80 and an FFF printing apparatus 90 on top of the filament feeding system 80. FIG. 6 shows a back view of the FFF printing apparatus 90 and the filament feeding system 80. In this embodiment, the filament feeding system 80 comprises the above mentioned decoupler 1, a prefeeder 81 and a processing system 82. The FFF printing apparatus 90 comprises a printer feeder 91 and a further processing system 92. The processing system 92 is connected to the processing system 82 of the filament feeding system 80. This connection may be embodied by a communication cable 93. Alternatively, the connection may be a wireless connection. It is noted that the example of FIG. 6 shows a modular FFF printing system. It is noted that the two modules 80 and 90 could be integrated into one printing FFF printing system where there is no need for two separate processing systems, and a single processing system will suffice.

As can be seen from FIG. 6, the decoupler 1 is coupled to the prefeeder 81 via a tube 101, which may be a flexible tube. The slider of the decoupler 1 is coupled to the printer feeder 91 via a flexible tube 102. As can be seen from the figure, the flexible tube 102 is formed as an S-shaped tube. Furthermore, the printer feeder 91 is coupled to a print head (not visible in FIG. 6) via a flexible tube 103, also referred to as Bowden tube 103.

Figure 7:
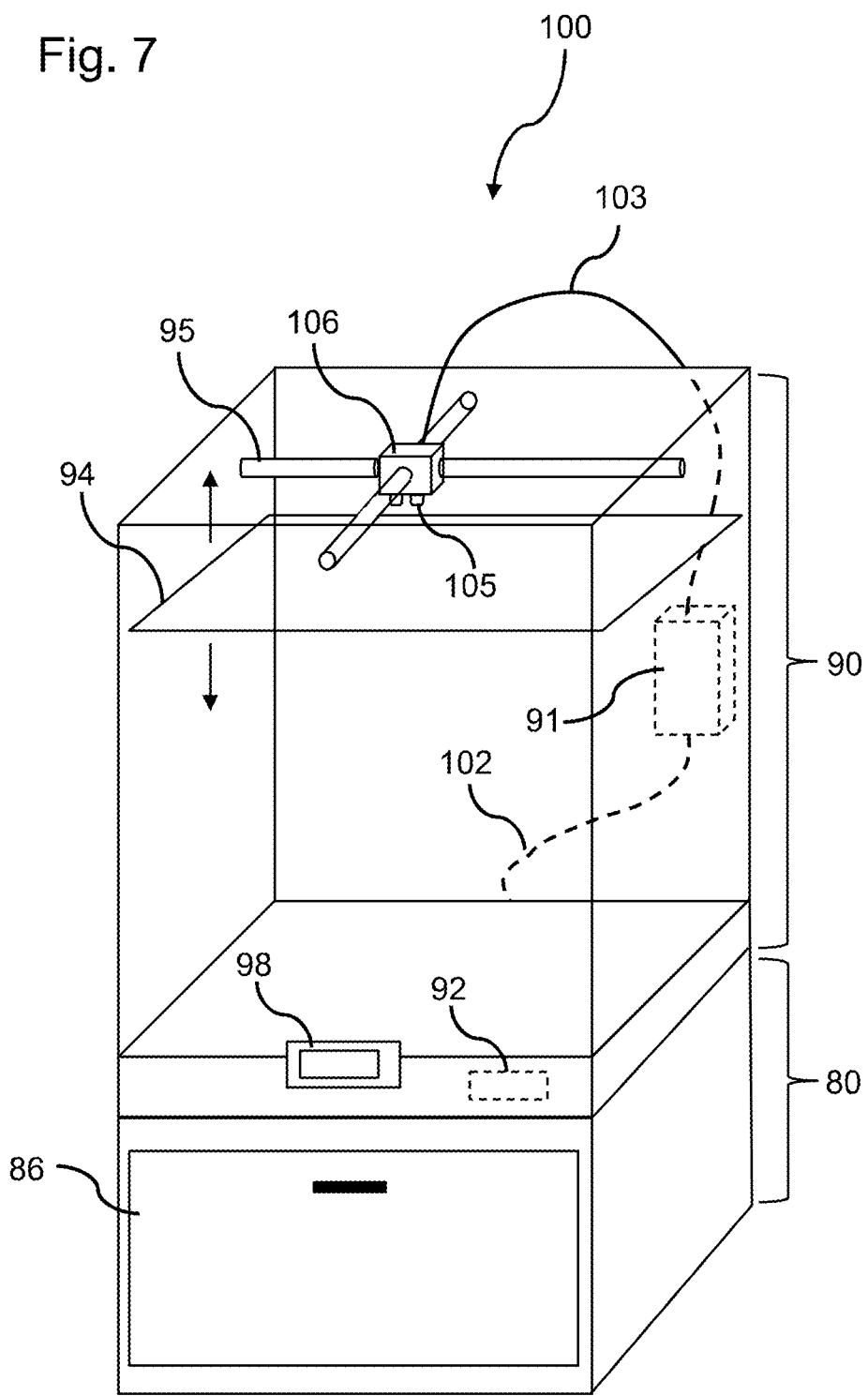
FIG. 7 shows a perspective view of the FFF printing system of figure in which the front of the system is visible.

FIG. 7 shows a perspective view of the FFF printing system 100 of FIG. 6 in which the front of the system is visible. In this example the FFF printing apparatus 90 comprises a print head 105. The print head 105 comprises a nozzle (not visible in FIG. 7) where molten filament can leave the print head 105. The filament 4 is fed into the print head 105 by means of a printer feeder 91. The FFF printing apparatus 90 also comprises a gantry arranged to move the print head 105 at least in an X-direction. In this embodiment, the print head 105 is also movable in a Y-direction perpendicular to the X-direction. The gantry comprises at least one mechanical driver (not shown) and one or more axles 95 and a print head docking unit 106. The print head docking unit 106 holds the print head 105 and for that reason is also called the print head mount 106. It is noted that the print head docking unit 106 may be arranged to hold more than one print head, such as for example two print heads each receiving its own filament. A build plate 108 may be arranged in or under the 3D printer 1 depending on the type of 3D printer. The build plate 18 may comprise a glass plate or any other object suitable as a substrate. In the example of FIG. 1, the build plate 94 is movably arranged relative to the print head 105 in a Z-direction, see arrows in FIG. 7. The FFF printing apparatus 90 also comprises a user interface 98 for showing information and for receiving instructions from the user.

The printer feeder 91 is arranged to feed and retract the filament 4 to and from the print head 105. The printer feeder 91 is arranged to feed and retract filament at different speeds to be determined by the processing system 92. A retraction may be needed in case a different type of filament is needed, another print head takes over the printing, the printing process is paused, or in case the filament spool is nearly empty (end-of-filament). As mentioned above, the feeding and retraction of filament by the printer feeder 91 needs to be aligned with the operation of the prefeeder 81. This will be discussed with reference to FIG. 13 below.

Figure 8:
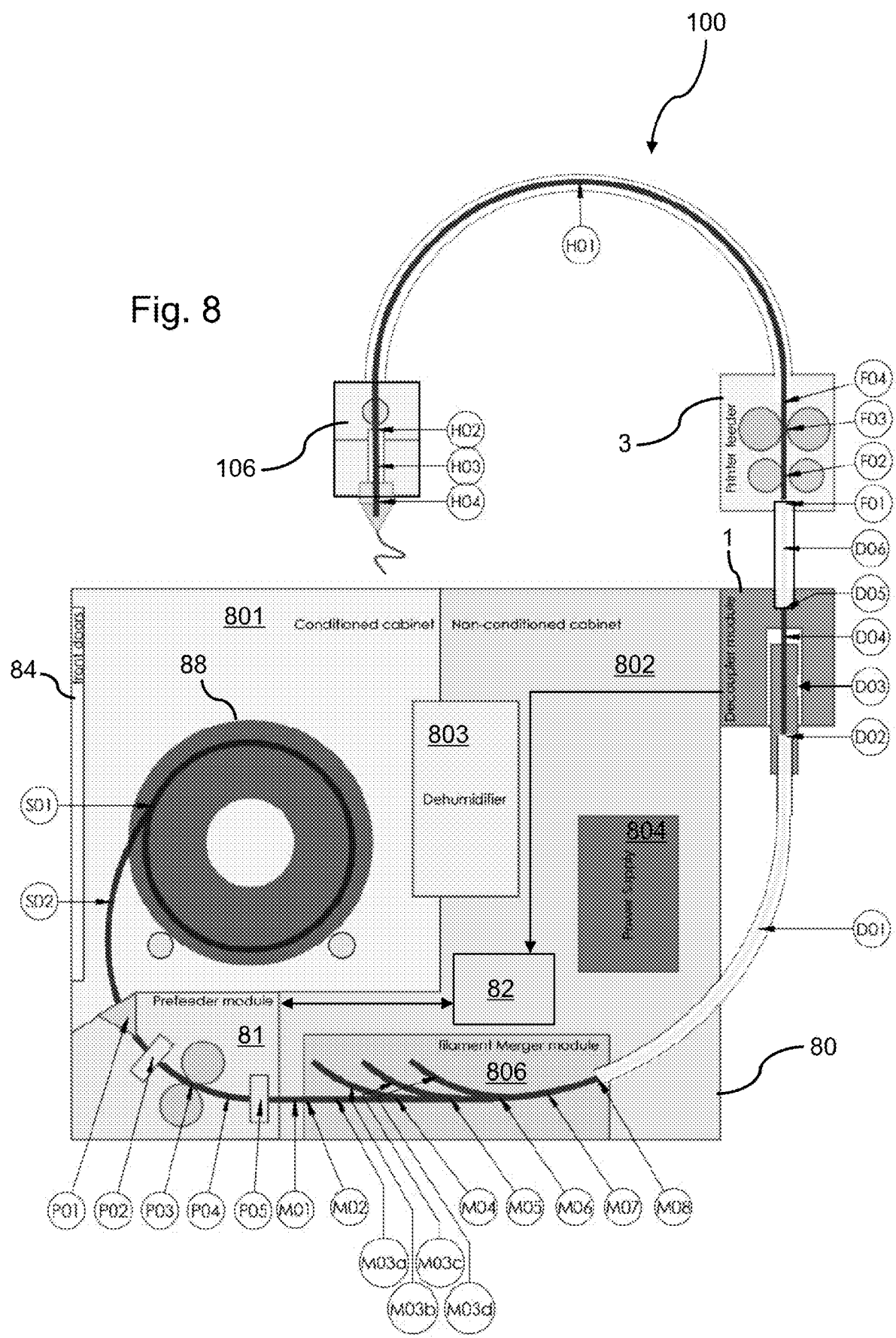
FIG. 8 schematically shows elements of a single nozzle FFF printing system comprising a filament feeding system.

FIG. 8 schematically shows elements of a single nozzle FFF printing system comprising a filament feeding system 80. FIG. 8 shows a schematic cross section wherein the filament feeding system 80 comprises a box shaped housing having a front door 84. In this embodiment, the filament feeding system 80 further comprises a container 801 for storing filament spools. In this embodiment the container 801 is air conditioned. The container 801 is also referred to as the conditioned cabinet 801. A dehumidifier 803 is arranged to extract air out of a non-conditioned cabinet 802, dehumidify the air, and then send it into the conditioned cabinet 801. The filament feeding system 80 also comprises a power supply 804, a prefeeder module 81 and a processing unit 82. The filament feeding system 80 also comprises a filament merger module 806 which is arranged to merge filament channels coming from multiple filament entries into a single merger exit path M07.

Now the course of the filament is described. S01 indicates the filament-spool separation where the filament leaves a spool 88. S02 indicates a free filament arc. P01 indicates a prefeeder entry funnel. P02 indicates a first filament detector. P03 indicates a prefeeder drivetrain. P04 indicates a prefeeder path. P05 indicates a second filament detector. M01 indicates a first filament detector. M02 indicates a merger entry. M03*a*-M03*d* indicate merger pathways. M04-M06 indicate merger junctions. M07 indicates a merger exit path. M08 indicates a merger exit. D01 indicates a merger-decoupler Bowden tube. D02 indicates a decoupler entry. D03 indicates a decoupler slider. D04 indicates a decoupler gap. D05 indicates a decoupler exit. D06 indicates a decoupler-feeder connection. F01 indicates a printer feeder entry. F02 indicates a flow sensor. F03 indicates a printer feeder drivetrain. F04 indicates a printer feeder exit. H01 indicates a printhead Bowden tube. H02 indicates a print core entry. H03 indicates a cold end, and finally H04 indicates a hot end.

As can be seen from FIG. 8, the slider D02 of the decoupler 1 is connected to the Bowden tube D01 which is beginning at merger exit M08. Because the tube D01 is a flexible tube, is can bend if needed. A bending of the tube will cause the movement of the slider in case too much filament builds up in this part of the tubing.

The decoupler 1 (i.e. the filament path length measurement device) provides information for the operation of the prefeeder 81 during filament loading, printing, and unloading of the filament. For example, during filament feeding, the prefeeder 81 will feed filament down the tubes, until the filament reaches the printer feeder entry F01. The filament may get blocked by a not yet activated printer feeder 3. As a result, the filament tension in the Bowden tube D01 will increase and due to that, the slider D03 will slide out of the decoupler 1. Movement of the slider D03 will be detected by the sensor (see also FIG. 1B) in the decoupler 1, and the obtained measurement data may be used to activate, or adjust activation of, the print feeder 3.

In case of feeding a dual nozzle printing apparatus, the filament feeding system 80 may comprise two filament merger modules 806, two merger exit paths and two decouplers 1. A first decoupler will be coupled to a tubing leading to a first printer feeder, and a second decoupler will coupled to another tubing leading to a second printer feeder. In case, the printing apparatus comprises more than two nozzles, such as three, four or even more, a corresponding number of decouplers, filament merger modules and merger exit paths could be provided in the filament feeding system.

Figure 9:
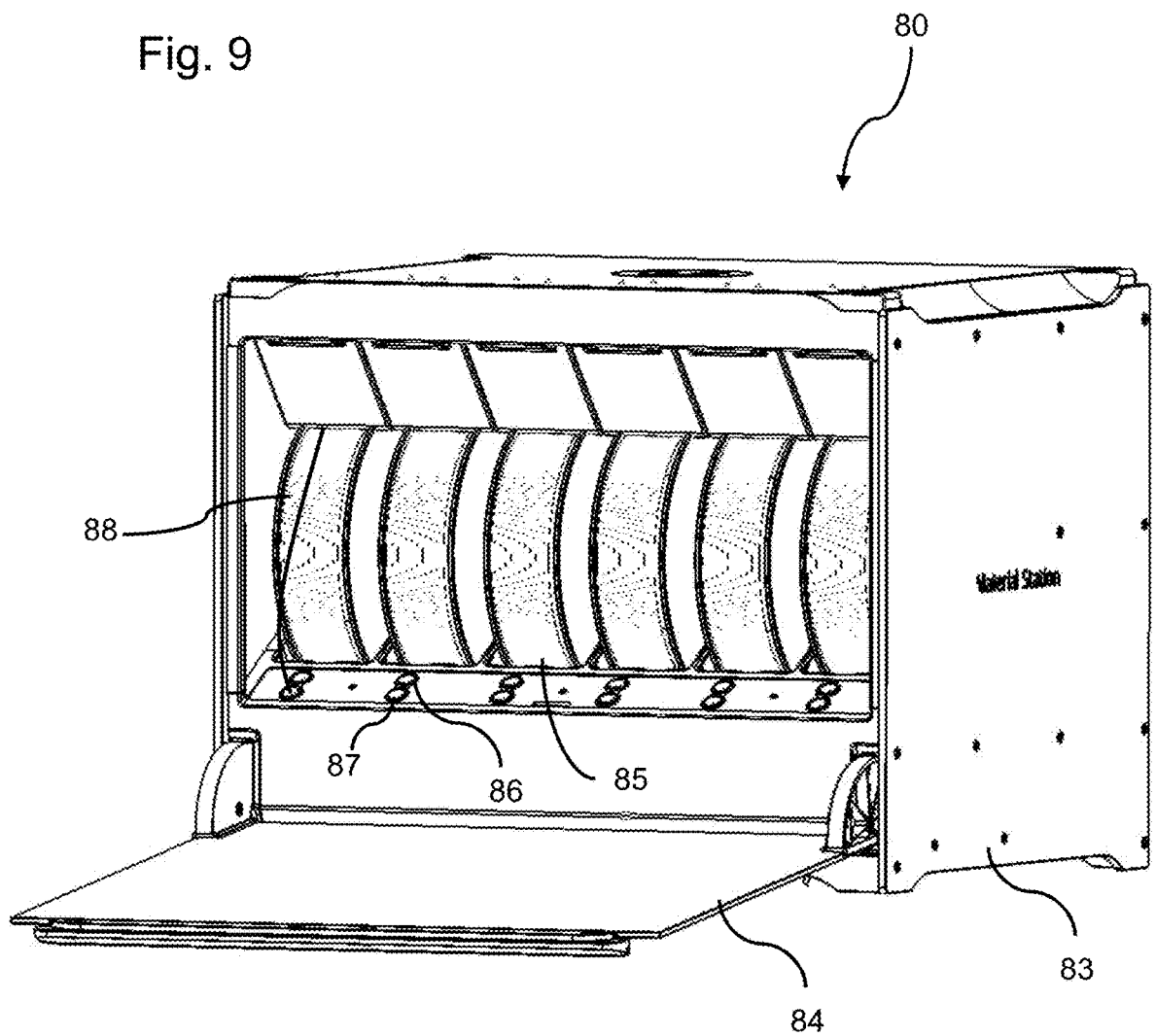
FIG. 9 shows a perspective view of the filament feeding system according to a further embodiment.

FIG. 9 shows a perspective view of the filament feeding system 80 according to a further embodiment. In this example, the filament feeding system 80 comprises a box 83 having a door 84. The opening of the door 84 gives access to a number of bays arranged to store multiple filament spools 85. In this example, the box 83 has six bays for storing six filament spools. This embodiment is suited for supplying two filaments to two print heads of a dual nozzle printing system. At each bay two filament entries 86, 87 are arranged. These entries are connected via channels to a prefeeder arranged for each bay separately. So, in this embodiment, the filament feeding system 80 comprises six prefeeders. At each bay, the two filament entries 86, 87 may be labelled, for example using numbers '1' and '2' or 'I' and 'II' so that the user can put the correct filament into the filament entry. Let's assume that a spool in bay 1 holds PLA, and that the user wants to print PLA via a first nozzle and another second material via a second nozzle. Then the user is prompted by the user interface to insert the PLA filament in the first filament entry labelled '1'.

Figure 10:
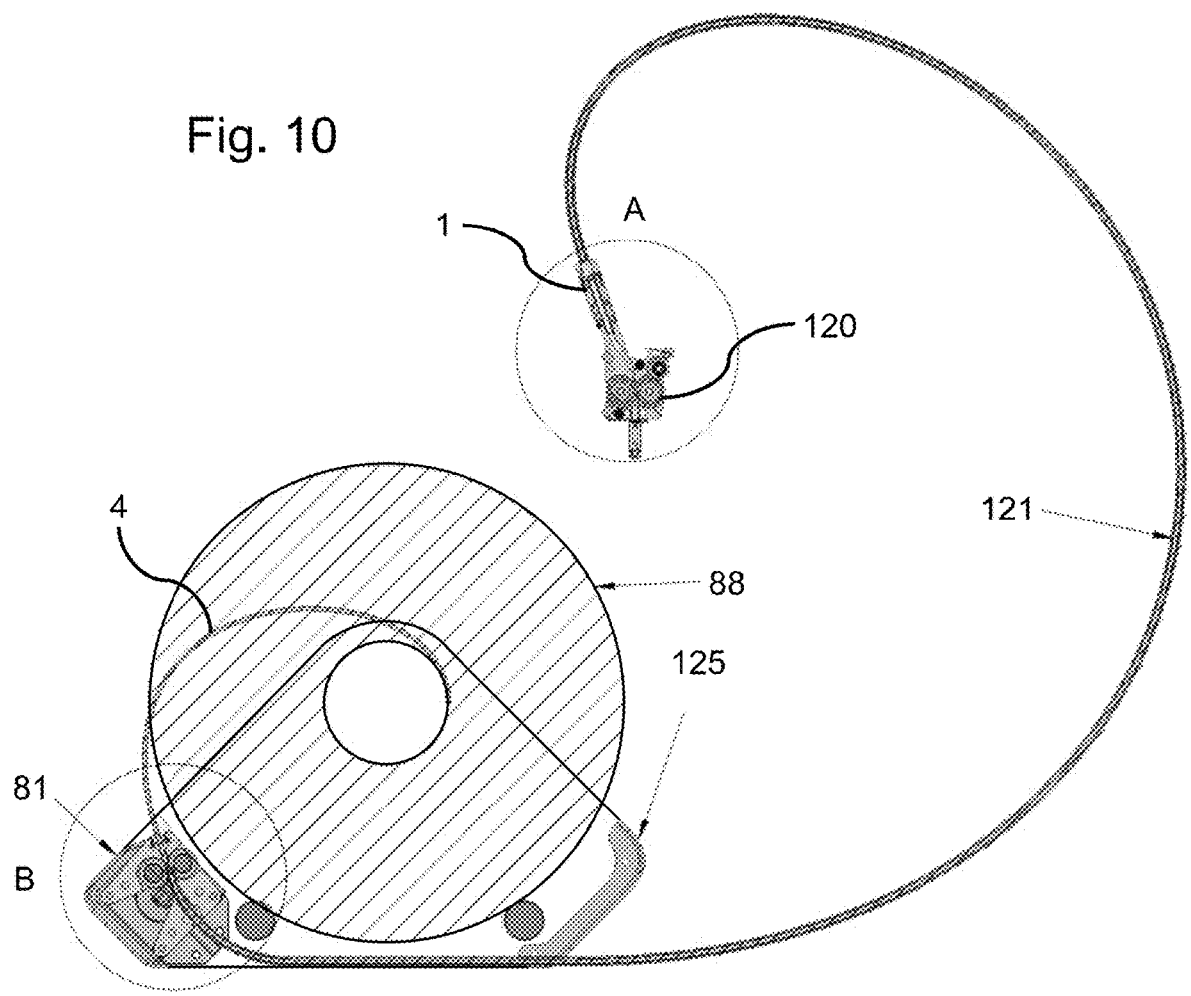
FIG. 10 shows a print head having a direct feeder incorporated.

In an embodiment, the decoupler 1 is arranged in a direct feeder printing system. FIG. 10 shows a direct drive print head assembly 120 having a direct feeder incorporated. The decoupler 1 is now arranged onto the direct drive print head assembly 120, instead of remote from the print head like in the previous embodiments. A filament 4, stored on a spool 88, is led to the direct drive print head assembly 120 using a Bowden tube 121 and a prefeeder 81. The spool 88 may be arranged in a spool holder 125. It should be noted that instead of one spool holder there could be multiple spool holders next to each other, similar to the plurality of bays in the box 83 shown in FIG. 9. The direct drive print head assembly 120 could comprise a single print head or multiple print heads. In case of a multiple print heads, multiple prefeeders and multiple Bowden tubes could be arranged.

Figure 11:
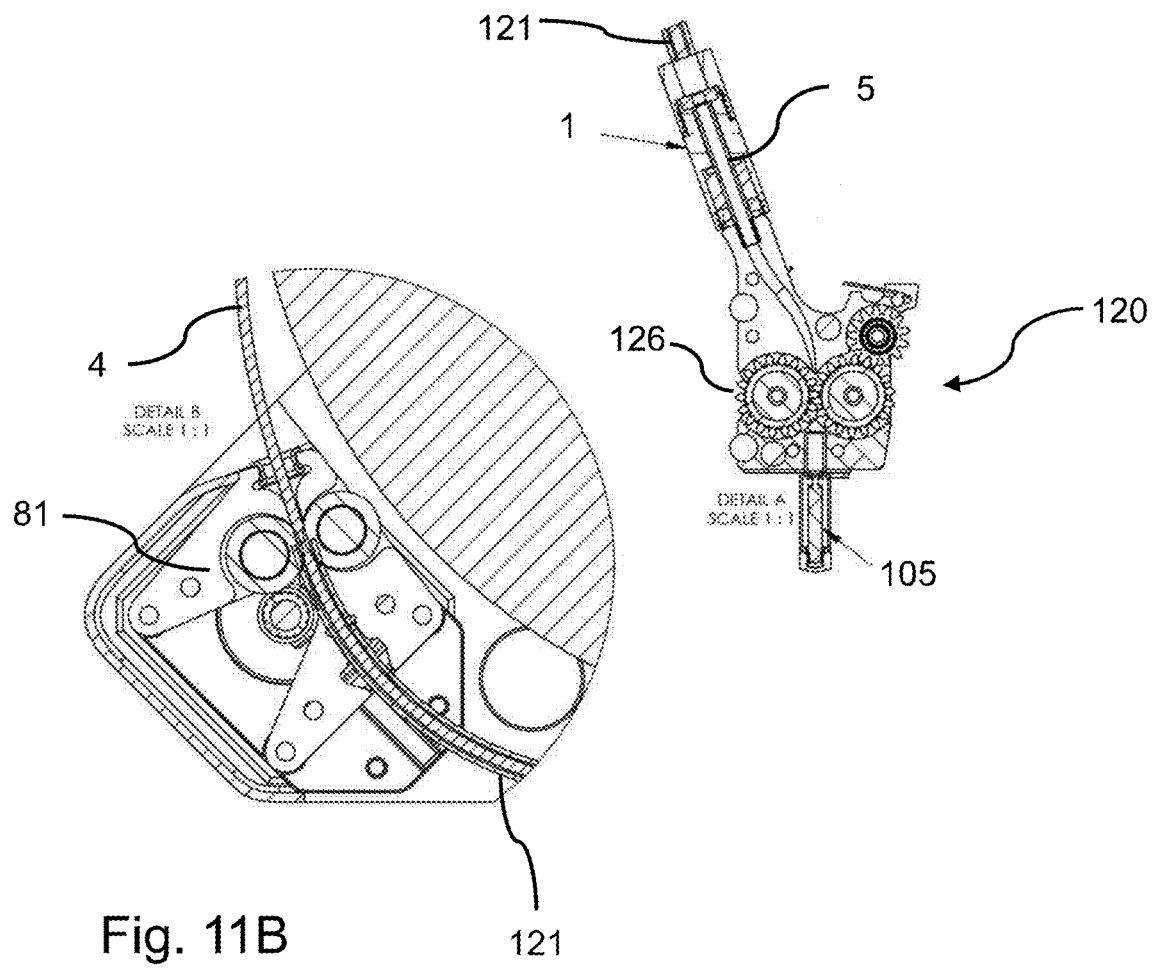
FIG. 11A is a detailed view of the direct feeder print head of FIG. 10.
FIG. 11B is a detailed view of the prefeeder of FIG. 10. As can be seen, the prefeeder feeds the filament into the Bowden tube.

FIG. 11A is a detailed view of the direct drive print head assembly 120 of FIG. 10. As can be seen, the direct drive print head assembly 120 comprises a feeder 126 and a print head 105. The decoupler 1 comprises a slider 5 slidably arranged in a housing of the decoupler 1. The housing of the decoupler is mounted on the direct drive print head assembly 120. FIG. 11B is a detailed view of the prefeeder 81 of FIG. 10. As can be seen, the prefeeder feeds the filament 4 into the Bowden tube 121.

Figure 12:
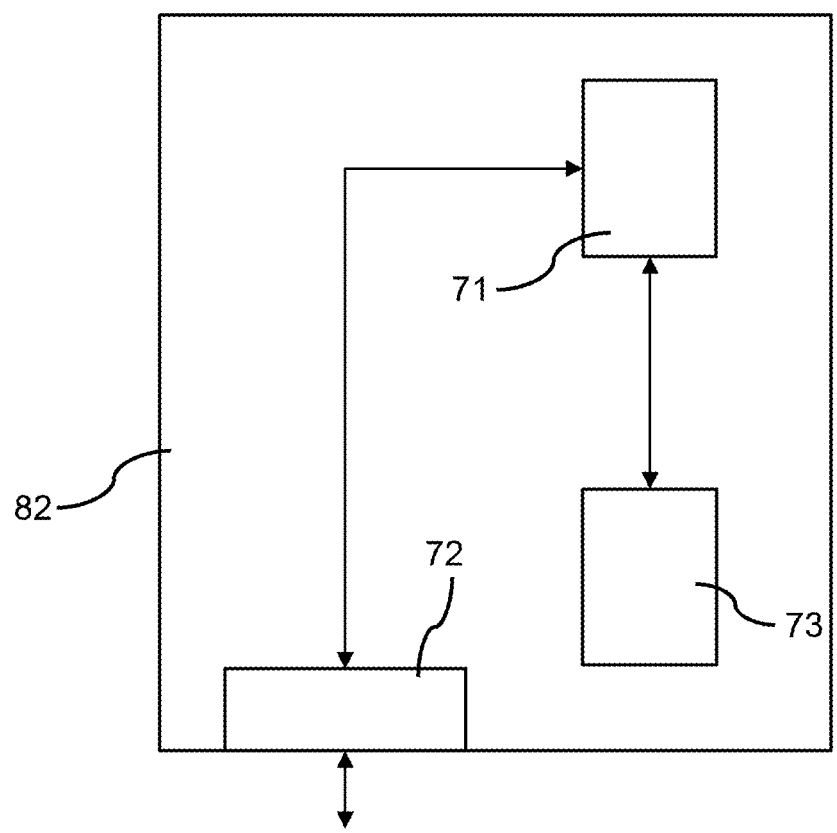
FIG. 12 schematically shows the processing system of the filament feeding system according to an embodiment.

FIG. 12 schematically shows the processing system 82 of the filament feeding system according to an embodiment. The processing system 82 comprises a processing unit 71, an I/O interface 72 and a memory 73. The processing unit 71 is arranged to read and write data and computer instructions from the memory 73. The processing unit 71 is also arranged to communicate with sensors, such as the measuring device 1, and other equipment via the I/O interface 72. The memory 73 may comprise a volatile memory such as ROM, or a non-volatile memory such as a RAM memory, or any other type of computer-readable storage. The processing system 82 may comprise several processing units. It is noted that the processing system 92 of the FFF printing apparatus may comprise the same elements as those described in FIG. 12.

In an embodiment of the invention, the processing system 82 is arranged to control the prefeeder 81 using a state machine. In case the filament feeding system 80 comprises multiple prefeeders, the processing system 82 may be arranged to simulate a state machine for each prefeeder. In an embodiment, the decoupler 1 generates several different signals depending on the stroke positions of the slider 5. If the slider is pulled out of the housing to an extend that the slider is stopped by the torsion springs, the decoupler may generate a signal called PullPos to indicate that the slider is beyond a certain force threshold. If the slider is pushed into the housing to an extend that the slider is stopped by the torsion springs, the decoupler may generate a signal called PushPos to indicate that the slider is beyond another threshold in the other direction as compared to the PullPos threshold. If the slider is pulled out of the housing to an extend that the slider is stopped by the torsion springs, the decoupler may generate a signal called PickupPos, to indicate that the feeder has grip on the filament.

Figure 13:
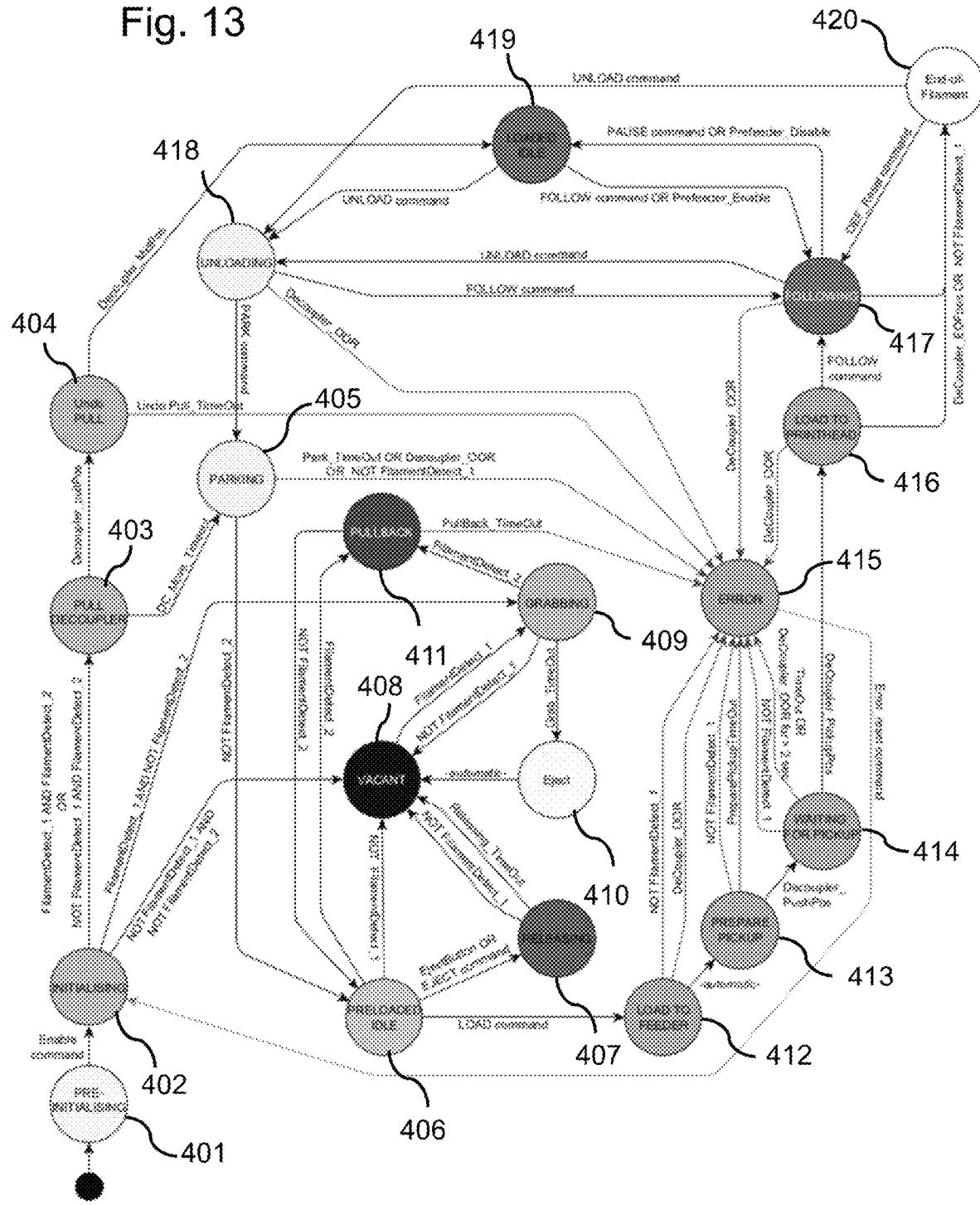
FIG. 13 shows an example of a state diagram of one prefeeder.

In FIG. 13 an example of a state diagram of one prefeeder 81 is shown. In case of multiple prefeeders, each of the prefeeders works according to this scheme, and they can be in different states independent of each other. For example, while printing, one prefeeder (or two prefeeders in a case of a dual nozzle system) may have status 'Following', while the others will either be 'Preloaded idle' or 'Vacant'.

Each circle in FIG. 13 is a so-called state, and within such a state a prefeeder exhibits specific behaviour. Between the circles/states there are arrows, those are the 'transitions' and there is the condition in text; the condition to go from one state to another state. Two possible conditions may be provided by the prefeeder sensors. The prefeeder may comprise a first filament sensor, see P02 in FIG. 8, to detect filament between the spool and the prefeeder. A second filament sensor, see P05, may be arranged to detect filament between the prefeeder and the decoupler. The first filament sensor P02 will generate a signal FilamentDetect_1 if it detects a filament, whereas the second filament sensor P05 will generate a signal FilamentDetect_2 if it detects a filament. The signals are processed by the processing system 82.

First the prefeeder 81 will get in a PRE-INITIALIZING state 401, which is a waiting state after Power on. Next, the prefeeder 81 will get into an INITIALIZING state 402, in which the filament detection sensors are scanned to see where/if material is present. Depending on different sensor values the correct next action will follow. For example, if both a Filament_Detect_1 and a Filament_Detect_2 is received, the prefeeder may get into a PULL DECOUPLER state 403, in which the prefeeder will try to move the slider 5 of the decoupler 1. This gives an indication on whether the filament is loaded in the print feeder or not. Next, the prefeeder may get into an UNDO PULL state 404, wherein the prefeeder is used to move the slider of the decoupler back into the normal printing area. Next, the prefeeder may get into a LOADED IDLE state 419, in which the filament is loaded into the printer feeder and the prefeeder is idle. Next, the prefeeder may get into a FOLLOWING state 417, in which a selected prefeeder speed is controlled using a decoupler lookup table for following the printer feeder. The prefeeder may feed filament intermittently to match the printer's filaments need and will use little power.

The prefeeder 81 may get into an UNLOADING state 418, in which filament is unloaded from the printer head by the printer feeder, to just beyond its grip wheel. The prefeeder 81 may be controlled by a so-called Decoupler_pullpos_setpoint lookup table for pulling filament. The printer feeder is set to run as well, in order to release the filament.

The prefeeder may get into a PARKING state 405, in which filament is unloaded from the printer feeder by the prefeeder, to a parking position.

The prefeeder may get into a PRELOADED IDLE state 406, in which the prefeeder is disabled and filament is present in the prefeeder 81. Next, the prefeeder may get into a RELEASING state 407.

The prefeeder may get into a LOAD TO FEEDER state 412, in which the prefeeder feeds filament relatively quick to the printer feeder. The filament length to be fed can be found in a lookup table which comprises information on the distance between the specific prefeeder and the print feeder.

The prefeeder 81 may get into a PREPARE PICKUP state 413 in which the prefeeder speed is set low, while monitoring the decoupler 1 to reach a PushPos setpoint; the prefeeder 81 will push the filament into the printer feeder.

The prefeeder may get into a WAITING FOR PICKUP state 414 in which the prefeeder speed is low, but the printer feeder is now speed up. Once the decoupler has sent a PickupPos signal, the prefeeder will get into the FOLLOWING state.

The prefeeder may get to a LOAD TO PRINTHEAD state 416 which is the first state in which the decoupler position is used as input for the prefeeder speed, via a lookup table.

The prefeeder may get into an END-OF-FILAMENT state 420 in which the filament feeding system will signal to the printer that an end-of-filament has been detected. When detected by the decoupler, the prefeeder is disabled to prevent grinding.

The prefeeder may get into a GRABBING state 409 in which the prefeeder is set to run slowly in order to grab the offered filament.

The prefeeder may get into a PULLBACK state 411 in which the prefeeder is set to run backwards, moving the filament to a parking position.

The prefeeder may get into an EJECT state 410 in which the prefeeder is to run backwards for a certain period of time, such as a period of for example 35 seconds.

The prefeeder may get into an ERROR state 415 in which the prefeeder is disabled, and the system is awaiting an error reset command coming in via e.g. the user interface of the printer.

The prefeeder may get into a VACANT state 408 in which the prefeeder motor is disabled.

In FIG. 13 the condition 'prefeeder disable' indicates that there is no electrical current running through the motors of the prefeeder. By disabling the prefeeder no heat is generated which would disadvantageously heat up the filament, before it reaches the print core.

Figure 14A:
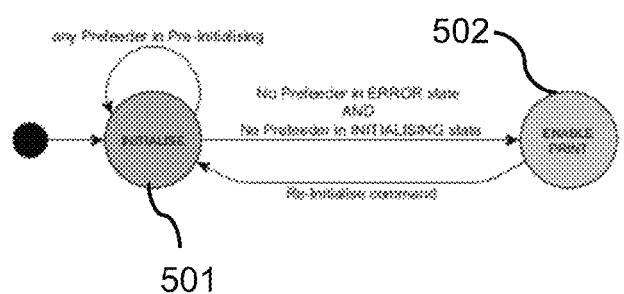
FIG. 14A is a state diagram of a feeding system using multiple prefeeders.
Figure 14B:
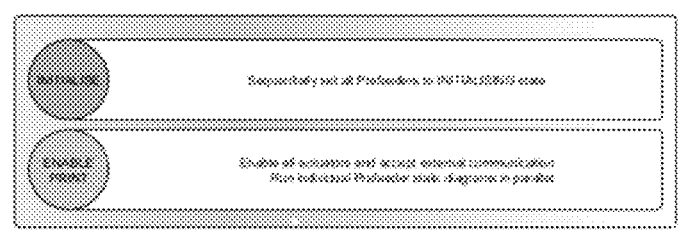
FIG. 14B is an index of the state diagram of FIG. 14A.

FIG. 14A is a state diagram of a feeding system using multiple prefeeders. FIG. 14B is an index of the state diagram of FIG. 14A. The feeding system can be in an INITIALISE state 501, in which all prefeeders are sequentially set to the INITIALISING state. In an ENABLE PRINT state 502 all actuators (prefeeders and decouplers) are enabled and the feeding system will accept external communication.

Now a more detailed behaviour of the prefeeder 81 during loading and unloading, especially with regard to the role of the decoupler 1, will be described with reference to FIG. 13. Below both processes will be described, from prefeeder state to prefeeder state.

It is noted that when printing, preferably the position of the slider 5 in the decoupler 1 is kept in the region where the two torsion springs (see also FIG. 5) are not biased, so that the filament is offered tension-free to the FFF printing apparatus 90. The FFF printing apparatus 90 should not 'feel' the filament feeding system 80 while printing, because pushing against or pulling on the filament directly results in over- or under-extrusion: the more or less passing through of filament than intended (after all, it is an open loop instruction, without feedback or correction).

Load Material.

First, a spool must be placed in one of the bays of the filament feeding system 80, and the filament end is inserted into a funnel (i.e. one of the entries 86, 87).

The prefeeder was in 'Vacant', but the FilamentDetect_1 transition comes into effect, and the state goes to 'Grabbing'. Which of the two entries 86, 87 is used determines the correction in rotation of the prefeeder, and physically determines whether that filament goes to Feeder 1 or Feeder 2.

In the state 'Grabbing', see state 409, the prefeeder rotates until the second filament sensor P05 sees the filament, then goes to 'Pullback' in which the prefeeder turns back until this same sensor does not see the filament anymore. Through this 'back and forth' along the sensor we know for sure that the filament is well grabbed by the prefeeder, the state is now 'Preloaded idle'. During this 'preloading' we check if there is an NFC tag present, for material type detection. If so, the material type is passed on to the linked printer. If not, the user will be informed that there is 'NEW' material, after which the user will have to indicate what kind of filament has been placed via the printer screen.

If a print job is then started, filament is needed to print it. The printer 'looks' at its available list of materials (which are present in Preloaded idle prefeeders) and if there is a match between the print job and the available materials, it sends the LOAD command to the correct prefeeder. (transition Preloaded Idle→Load to Feeder). Load to feeder starts with a fixed throughput distance, at fixed speed, to get the filament close to the printer Feeder. After this distance it automatically goes to 'Prepare Pickup'. In the PREPARE PICKUP state 413 the prefeeder runs slower than in the LOAD TO FEEDER state 412, and the position of the decoupler is monitored, but it does not determine the speed. However, the position is used as a condition. The PushPos position does not lie in the part between the torsion springs, but in the spring range, in the extended part. The decoupler can only be extended so far because the filament presses against the printer Feeder. When this happens, the turning of the printer Feeder is started, and it runs a little faster than the Prefeeder (which does not stop, unless the picking up fails completely). This was Prefeeder Prepare Pickup→Waiting for Pickup.

In Waiting for Pickup, the printer Feeder rotates a little faster than the Prefeeder, and when the printer grabs the filament, it will pull the decoupler back in again (position goes back towards 0) because of the difference in speed. This is done until Decoupler_PickupPos, a position in the other (first/low) spring range. This is where the decoupler only comes in when the filament is actively pulled (by the faster-rotating printer Feeder), and this is the condition to switch to 'Load to Printhead'. This use of both spring ranges ensures that we know for sure whether the printer has grabbed the filament or not.

'Load to Printhead', see state 416, is the first state in which the decoupler position is used as input for the prefeeder speed, via a lookup table. If the decoupler is low, the filament feeding system 80 apparently feeds less material than the FFF printing apparatus 90 requires. This position corresponds to a high prefeeder speed, so that it can catch up with the backlog. If the decoupler 1 is high, we apparently provide too much material, this position gives a negative speed (=return to feeding system) in the table. In this state, the filament feeding system 80 is really a slave, who 'feels' how much filament it has to bring in via the decoupler 1.

Print

'Following' is the state in which the prefeeder of the Material Station 20 is in during actual printing. The printer sends the FOLLOW command to indicate that it needs to switch from the load-to-feeder lookup table to the following table. The following table is calmer/reducer, because the filament speeds during printing are much lower than during loading and unloading. There is also an extra control loop active in this state with the aim to dissipate as little power as possible, by means of a hysteresis controller. This works as follows: we gradually lower the decoupler from the middle towards the lower spring arms 41, 43 (as a result of the use of filament by the printer), and shortly before it touches the lower spring arms 41, 43 we quickly continue with filament until the decoupler is in the middle again, and then we switch off the power supply to the prefeeder again.

This way we have a kind of duty-cycle and the prefeeder is off in about 90% of the time (depending on the print job this can be more or less). This manoeuvre is advantageous to reduce heat development at the bottom of the filament feeding system 80.

Unloading Material

The filament needs to be unloaded once a print job is finished (so that the filaments are returned to the conditioned/dry space), or during a print job when a spool becomes empty (so that the filament path can be cleared for another, full spool). The prefeeder was still in the Following state and is put into 'Unloading' by the printer via the UNLOAD command. This state has its own lookup table that is arranged in such a way that the prefeeder stands still when the decoupler is in the lower spring arm range and therefore there is a tensile stress on the filament. This tensile stress helps the printer feeder to pull the filament out of the print core. More importantly, it prevents flexible materials from getting stuck. Just try pushing an elastic through a winding path with some interruptions/transitions; it will bulge/kink and then form a loop or fasten itself. However, if the prefeeder pulls on the filament while the printer Feeder returns the filament, this rubber band will always be tightened and will not have the chance to buckle or lock itself in. When printer has ejected the filament completely (the printer Feeder cannot push further than where it is seated; it lets go) the printer sends the PARK command to the prefeeder. Then it switches to 'Parking' state, where the prefeeder speed is constant, and this (independent of decoupler position) feeds back the filament until the second filament detection sensor sees no more filament, and then we are 'Preloaded Idle' again.

The present invention has been described above with reference to a number of exemplary embodiments as shown in the drawings. Modifications and alternative implementations of some parts or elements are possible and are included in the scope of protection as defined in the appended claims. It should be noted that the above-mentioned embodiments illustrate rather than limit the invention, and that those skilled in the art will be able to design many alternative embodiments. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

The invention claimed is:

1. An FFF printing system, the FFF printing system comprising:
   a print head;
   a feeder arranged to feed a filament into the print head;
   a container for storing the filament on one or more filament spools;
   a prefeeder arranged to feed the filament from the spools to the feeder;
   a first flexible tube for guiding the filament;
   a filament path length measuring device comprising:
   a housing comprising a first opening for passing through of the filament, and a second opening opposite the first opening;
   a slider slidably arranged in the housing and partly extending out of the second opening, the slider comprising a filament channel for passing through of the filament, wherein an outer end of the slider, that is outside the housing, is connected to a first end of the flexible tube;

at least one contactless sensor arranged to detect a change of position of the slider relative to the housing to obtain measurement data indicative of a path length change of the filament in the first flexible tube, wherein a second end of the first flexible tube is connected to a connection point of the FFF printing system that is static relative to the housing of the measuring device, and wherein the FFF printing system further comprises a processing system arranged to receive the measurement data and to control the prefeeder depending on the measurement data.

2. The FFF printing system according to claim 1, wherein the connection point is one out of the set comprising:
an upstream side of the feeder,
a downstream side of the prefeeder, and
a downstream side of a filament merger module.

3. The FFF printing system according to claim 1, wherein the FFF printing system comprises a further processing system arranged to control the feeder and arranged to communicate with the processing system.

4. The FFF printing system according to claim 1, wherein the at least one contactless sensor comprises a Hall sensor.

5. The FFF printing system according to claim 1, wherein the measuring device comprises a torsion springs having two arms, each of the spring arms being arranged to counteract movement of the slider at a respective outer end of a stroke of the slider.

6. The FFF printing system according to claim 1, wherein the system comprises a direct drive print head assembly, and wherein the housing of the measuring device is mounted into the direct print head assembly.

7. The FFF printing system according to claim 1, wherein the contactless sensor comprises two Hall sensors interacting with a single magnet mounted on the slider.

8. The FFF printing system according to claim 7, wherein the measuring device comprises an analogue circuitry arranged to combine the output signals of the two Hall sensors, to obtain an analogue signal indicative of the position of the slider.

9. The FFF printing system according to claim 1, wherein the slider comprises a number of fingers coaxial arranged around a central axis, wherein side walls of the fingers facing the central axis, together with structures arranged in the housing, define a channel for guiding the filament.

10. The FFF printing system according to claim 9, wherein the number of fingers is three.

11. The FFF printing system according to claim 1, wherein the housing of the measuring device is mounted to an outer wall of the FFF printing system.

12. The FFF printing system according to claim 11, wherein the first flexible tube has an S-shape.

* * * * *